United States Patent
Hasenplaugh et al.

(10) Patent No.: US 7,725,657 B2
(45) Date of Patent: May 25, 2010

(54) DYNAMIC QUALITY OF SERVICE (QOS) FOR A SHARED CACHE

(75) Inventors: William C. Hasenplaugh, Jamaica Plain, MA (US); Li Zhao, Beaverton, OR (US); Ravishankar Iyer, Portland, OR (US); Ramesh Illikkal, Portland, OR (US); Srihari Makineni, Portland, OR (US); Donald Newell, Portland, OR (US); Aamer Jaleel, Hudson, MA (US); Simon C. Steely, Jr., Hudson, NH (US)

(73) Assignee: Intel Corporation, Santa Clara, CA (US)

(*) Notice: Subject to any disclaimer, the term of this patent is extended or adjusted under 35 U.S.C. 154(b) by 526 days.

(21) Appl. No.: 11/726,238

(22) Filed: Mar. 21, 2007

(65) Prior Publication Data

US 2008/0235457 A1 Sep. 25, 2008

(51) Int. Cl.
*G06F 12/06* (2006.01)
(52) U.S. Cl. .................................................. 711/130
(58) Field of Classification Search ........................ None
See application file for complete search history.

(56) References Cited

U.S. PATENT DOCUMENTS

| | | | |
|---|---|---|---|
| 6,223,256 B1 | 4/2001 | Gaither | |
| 6,829,679 B2 | 12/2004 | DeSota et al. | |
| 7,415,575 B1 * | 8/2008 | Tong et al. | 711/133 |
| 2003/0177313 A1 * | 9/2003 | Iyer et al. | 711/129 |
| 2005/0114605 A1 * | 5/2005 | Iyer | 711/133 |
| 2007/0006230 A1 | 1/2007 | Neiger et al. | |
| 2008/0235487 A1 | 9/2008 | Illikkal et al. | |

OTHER PUBLICATIONS

U.S. Appl. No. 11/503,633, filed Aug. 14, 2006, entitled "Providing Quality of Service (QoS) For Cache Architectures Using Priority Information," by Li Zhao, et al.
U.S. Appl. No. 11/527,222, filed Sep. 25, 2006, entitled "Quality of Service Implementations for Platform Resources," by Ramesh G. Illikkal, et al.
United States Patent and Trademark Office, Office Action Mailed Aug. 19, 2009 with Reply to Office Action filed on Nov. 18, 2009, in U.S. Appl. No. 11/726,316.
Volkmar Uhlig, et al., "Performance of Address-Space Multiplexing on the Pentium," 2002, pp. 1-15.
Aravind Menon, et al., "Diagnosing Performance Overheads in the Xen Virtual Machine Environment," Jun. 2005, pp. 1-11.

* cited by examiner

*Primary Examiner*—Tuan V Thai
*Assistant Examiner*—Duc T Doan
(74) *Attorney, Agent, or Firm*—Trop, Pruner & Hu, P.C.

(57) ABSTRACT

In one embodiment, the present invention includes a method for associating a first priority indicator with data stored in a first entry of a shared cache memory by a core to indicate a priority level of a first thread, and associating a second priority indicator with data stored in a second entry of the shared cache memory by a graphics engine to indicate a priority level of a second thread. Other embodiments are described and claimed.

17 Claims, 4 Drawing Sheets

DYNAMIC QUALITY OF SERVICE (QOS) FOR A SHARED CACHE

BACKGROUND

As semiconductor technology evolves, additional processing engines are being integrated in a single package, and even onto a single die. For example, some processors may be architected to include multiple processor cores and at least one graphics engine (GE). The cores and the graphics engines may share a last level cache (LLC). As graphics processing is very memory intensive, the only viable solution is to allow it to share the last level cache with the core. However, contention between the core and GE for the cache/memory bandwidth may cause non-deterministic behavior that may either hurt core application performance or graphics processing ability. One solution is to statically partition the last level cache, but this has the drawback of inefficient cache use. For example, some applications may not be helped by a cache and can have various phases. Therefore more cache space may not improve their performance and at the same time can hurt GE's performance since it cannot use the core's partition.

DETAILED DESCRIPTION

Figure 1:
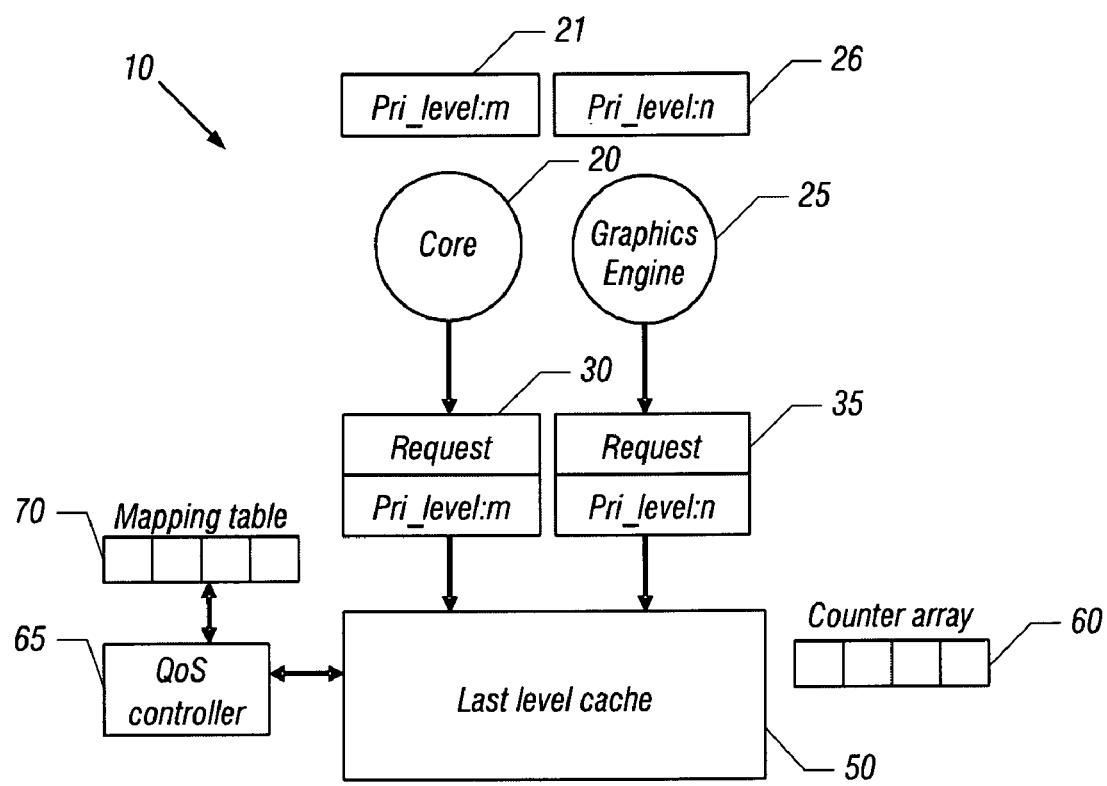
FIG. 1 is a block diagram of a portion of a system in accordance with an embodiment of the present invention.

In various embodiments, dynamic quality of service (QoS) mechanisms and policies that distribute cache space between one or more cores and other processing engines such as a graphics processor (herein a graphics engine or GE) may be provided based on various usage scenarios. Such mechanisms may enable the following usage scenarios: (a) allow a core or GE to be assigned priorities dynamically during execution and provide more cache space to the higher priority workload; (b) ensure that if different priorities are indicated and the higher priority engine is not using its allocated cache space to its advantage, the space can re-assigned to a lower priority; and (c) if both core and GE are set to the same priority, improving overall cache performance by giving more cache space to who needs it the most. Although described herein as based on cores and engines, priority may also be based on processes and/or threads executing on the hardware. In this way, fairness, prioritization or overall throughput benefits through a set of knobs exposed through basic input/output service (BIOS) or the operating system (OS) can be realized.

Various dynamic QoS mechanisms may be provided. In one embodiment, a gradient partition algorithm may be used, while in another a counter-based QoS mechanism that partitions a cache using a counter for each priority level application may be used. A gradient partition algorithm can optimize any sum of metrics, which are individually functions of their allocation of a shared resource. A metric H(C), which is a weighted sum of hitrates (each, a function of allocation $P_i$) of competing, priority weighted, threads can be constructed. Next, allocations to each data type that optimize H(C) may be sought, conditioned on the fact that the allocations to each data type must sum to the size of the cache, C. An application of the method of Lagrange multipliers reveals that the conditions for optimality occur when the weighted derivatives of the hitrate curves are equal. Again, a simple gradient descent algorithm set forth in Equations 1-4 below achieves such a condition where W equals weight, H equals hitrate, and P equals the portion of the cache allocated to a given data type (e.g., on an initiator basis (e.g., core or GE), priority level or so forth) percentage.

$$H(C) = \sum_{i=1}^{n} w_i H_i(P_i) \quad [1]$$

$$\sum_{i=1}^{n} P_i = C \quad [2]$$

$$\Delta H(C) + \Delta \lambda \left( \sum_{i=1}^{n} P_i - C \right) = 0 \quad [3]$$

$$\rightarrow \frac{\partial}{\partial P_i} w_i H_i(P_i) = \frac{\partial}{\partial P_j} w_j H_j(P_j) \forall i, j \quad [4]$$

The gradient partition algorithm utilizes such a gradient descent algorithm which divides the cache statically into two halves, partition A and partition B and attempts to enforce a different mix of cache allocations in each partition of the cache. This is achieved by holding an allocation threshold, which represents a percentage of lines that are placed into the cache with a first priority higher then a second priority, constant for all but one of the threads (a different constant threshold per thread) and skewing the allocation threshold for the other thread in each partition. For instance, the allocation threshold of graphics data for partition A may be T+delta and the threshold for partition B may be T−delta. The relative amount of data in a cache of a particular thread scales monotonically with its allocation threshold so if the threshold gets larger, so does the cache allocation. The resulting variation in the mix of cache allocations (by thread) allows us to measure the hitrate difference between the two halves of the cache. This difference creates a hitrate gradient along which the allocation threshold may travel to greedily find the maximum. The examination of the thread allocation thresholds may be toggled. Using this algorithm, the following may be achieved: hitrate may be optimized across threads with the same priority level; all other things being constant, increasing $w_i$ may increase the cache allocation to the ith thread; the weighted hitrates of each thread is optimized, the result being that $\Delta w_j$ extra blocks to the ith thread will yield the same improvement to H(C) as $\Delta w_i$ extra blocks to the jth thread.

By allowing the operating system (OS) and/or BIOS to manipulate the values of w, optimal system performance may be achieved (referred to herein as Utilitarian), preferential allocations to high-priority threads (herein, Elitist) and anything in between. In Elitist mode (i.e., highly varying w values), if the high priority threads do not make good use of their cache space, it will be given to lower priority threads, the process being a fluid consequence of optimizing the weighted hitrate. That is, there is no ad-hoc mechanism that attempts to realize that the high-priority thread is not making use of its space, rather it is a natural consequence of optimizing the weighted hitrate.

Embodiments that implement a gradient partition algorithm may be incorporated into various cache designs without the need for any per-tag state hardware. That is, a cache controller or other mechanism to handle insertion and replacement of data into a cache can be programmed to perform the gradient partition algorithm without the need for any specialized hardware. However, in other implementations a gradient partition algorithm may be implemented into a cache system including various QoS-based counters and other hardware, software and/or firmware to enable dynamic QoS allocation of data from one or more cores and other dedicated processing engines such as a GE into the cache. In other embodiments, a hash calculator to categorize sets in the cache into two classes, counters for measuring performance of the two halves of the cache, and a control and adaptation state machine may be present.

Referring now to FIG. 1, shown is a block diagram of a portion of a system in accordance with an embodiment of the present invention. As shown in FIG. 1, system 10 includes a core 20 and a graphics engine 25. In various embodiments, core 20 and graphics engine 25 may be part of a single semiconductor package, such as a multi-core processor including at least one dedicated graphics engine. Core 20 has a privilege level 21 associated therewith (i.e., privilege level M), while graphics engine 25 has a privilege level 26 associated therewith (i.e., privilege level N). In various embodiments, these privilege levels may be set by BIOS or the OS. These privilege levels or cache priority hints may be only a couple of bits to indicate (e.g., high, medium, low) and can be either hard coded during design, made configurable through the BIOS or exposed to the operating system through a platform QoS register.

Referring still to FIG. 1, during operation core 20 may make a request 30 for storage of data in a last level cache (LLC) 50, while graphics engine 25 may make a similar request 35. To determine appropriate allocations into LLC 50, various structures may be associated with LLC 50 including a counter array 60, a QoS controller 65 and a mapping table 70. While shown as separate components in the embodiment of FIG. 1, in some implementations these structures all may be implemented within a cache controller for LLC 50.

In various embodiments, counter array 60 may maintain a count of cache lines stored in LLC 50 of given priority levels. Priority bits for each cache line and counters of counter array 60 may indicate how much space has been consumed so far. The number of priority bits depends on the number of priority levels that the system will support. In some embodiments, two bits may be sufficient to provide for four levels of priorities. In addition to the priority bits per line, a bit mask may be present for each way. In one embodiment, this will be an overhead of only 64 bits (for 4 priority levels and 16 ways in the cache). Mapping table 70 may store thresholds for each priority level. Mapping table 70 contains the cache space threshold for each priority level. Initially this table is empty. As the programs execute, the entry is updated at a specified time interval. For example, if the threshold for priority 1 is 40%, it means that the cache space for priority 1 cannot exceed 40% of the total cache size. Based on this information, QoS controller 65 may control the allocation and replacement of data in LLC 50. While shown with this particular implementation in the embodiment of FIG. 1, the scope of the present invention is not limited in this regard.

Replacement policies may use priority bits in the cache and the priority thresholds to enforce QoS. There are two options to enforce space thresholds—line-based or way-based. For line-based QoS it may be assumed that cache space allocation is limited in terms of the number of lines. When a new cache line needs to be allocated, the counters are checked against its threshold registers. If its counter is below the limit, a least recently used (LRU) algorithm is used to find the replacement cache line no matter what priority it is. If the counter exceeds the threshold, a cache line from its own priority level will be replaced.

For way-based QoS, it may be assumed that cache space allocation is limited in terms of the number of ways per set. When a counter is below the limit for a given priority level, then all of the associated way mask bits are set. This indicates that a line tagged with this priority level can be allocated into any way of the cache. When the counter exceeds the threshold, the mask way bits are turned off one by one to ensure that the priority level does not exceed its space threshold.

Figure 2:
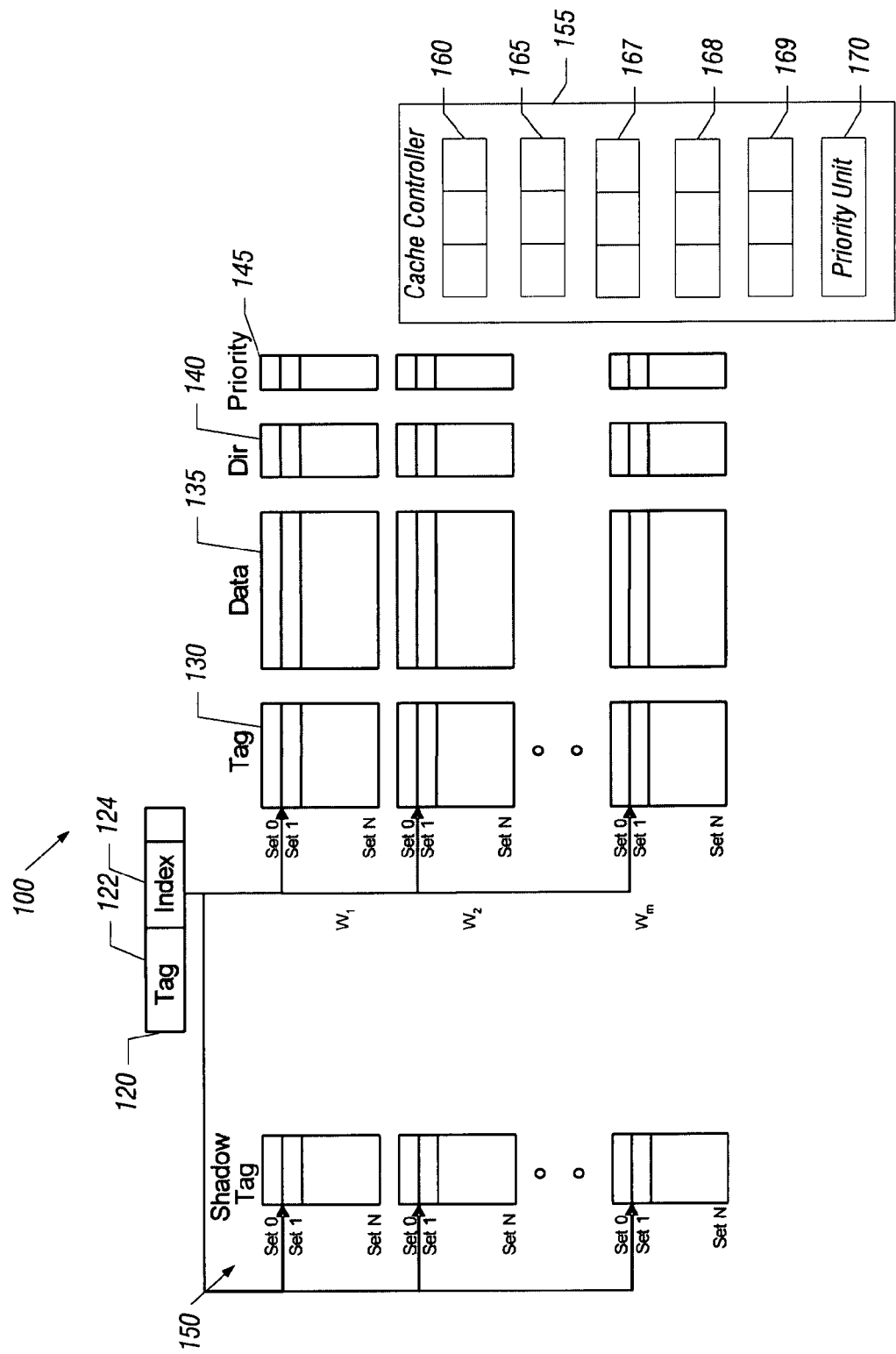
FIG. 2 is a block diagram of a cache memory in accordance with one embodiment of the present invention.

Referring now to FIG. 2, shown is a block diagram of a cache memory in accordance with one embodiment of the present invention. As shown in FIG. 2, cache memory 100, which may be shared cache such as a LLC or another shared cache, may be arranged according to a desired mechanism. For example, in some implementations, cache memory 100 may be arranged in an M-way N-set manner. Thus as shown in FIG. 2, cache memory 100 may include sets $Set_0$-$Set_N$. Furthermore, each set may include ways $W_1$-$W_M$. While shown as an M-way N-set associative cache, is to be understood that the scope of the present invention is not limited in this regard.

Still referring to FIG. 2, each cache line (i.e., corresponding to a given set) or entry may include a tag portion 130, a data portion 135, a directory portion 140, and a priority portion 145. These different portions or fields may be used to store different types of information. In various embodiments, tag portion 130 may be used to compare against a tag portion of the address to determine if the data matches the address being looked for, while data portion 135 holds the data of the cache line. Directory portion 140 may be used to indicate one or more private caches that include a copy of data. Priority portion 145 may be a priority indicator associated with the initiator that stored the data in data portion 135. More specifically, priority portion 145 may include a priority indicator that indicates a priority level of the core or other engine that accessed the data and caused the line to be installed into the cache (access could be a read or a write of the data).

To access entries in cache memory 100, an address 120 may be used. As shown in FIG. 2, specifically a tag portion 122 and an index portion 124 of address 120 may be used to access both a given way and set of cache memory 100. As further shown in FIG. 2, a shadow tag 150, which may be a copy of tag portion 130 may be maintained for some number of sets (e.g., 32 sets) to sample behavior of cache 100 when a given application or applications are executing.

As further shown in FIG. 2, a cache controller 155 may be present. Cache controller 155 may be used to control searching, storing, accessing, and eviction activities within cache memory 100. In the embodiment of FIG. 2, cache controller 155 may further include a counter array 160 to store an overall count of lines within cache memory 100 associated with different priority levels. This information (i.e., the count information present in counter array 160) may be used in connection with replacement policies. Furthermore, cache controller 155 may include a threshold storage 165. Threshold storage 165 may include a plurality of threshold registers that each include a predetermined threshold level. These threshold levels may correspond to an amount of cache memory 100 that may be consumed by data of a given priority level.

Referring still to FIG. 2, cache controller 155 may further include a miss counter 167 associated with tag portions 130 and second miss counter 168 associated with shadow tag portions 150. Using such miss counters, the number of misses may be recorded for each priority level. This information may be used to determine an appropriate threshold level for each priority. Further still, way masks 169 may be associated with each priority level, with each mask including a bit for each way of cache 100. As further shown in FIG. 2, cache controller 155 further includes a priority unit 170. Priority unit 170 may be used to determine, at replacement time, which line should be selected for replacement based at least in part on priority information. While shown with this particular implementation in the embodiment of FIG. 2, it is to be understood that the scope of the present invention is not limited in this regard and in other embodiments, different configurations of a cache memory may be realized.

To monitor applications' original behavior, the shadow or predictor tag may be provided, which is like a copy of the normal tag as shown in FIG. 2. Instead of keeping a shadow tag for each and every set, shadow tags may be maintained for a few sets (i.e., 32 sets) because a large cache can be sampled to obtain its approximated behavior. When the cache is accessed, the shadow tag is also accessed using a mapping table that gives more space to applications that have high priority. The number of misses is recorded in the shadow miss counter for each priority level. Similarly the number of misses in the normal cache is also recorded in the tag miss counter. At each time interval, the misses in the two counters are compared against each other to determine the appropriate threshold levels for each priority. Then the counters are reset to 0.

For example, assume two priority levels (0 as high and 1 as low). In the first time interval, the number of lines consumed by each priority (N0 for priority 0 and N1 for priority 1) is recorded, and the threshold for priority 0 (T0) as N0 plus a grant (for example 5% of the total cache size), and the threshold for priority 1 (T1) as N1 minus the grant may be set. The shadow tag will behave as the threshold guide, but the normal cache behaves as before. Then during each time interval, misses from the shadow tag and normal tag may be compared for priority 0. If the former is smaller than the latter, which means more cache for priority 0 has good effect, the mapping table may be set for the normal cache with the value from the shadow tag, and continue adding grant for T0 and reducing grant for T1 (which can be combined with constraints) for the shadow tag. Otherwise, the normal tag is unchanged and the grant to T1 from T0 is returned in the shadow tag. If overall performance is sought to be improved instead of that of the high priority applications, the scheme can be changed to compare the total miss from the two counters and update T0 and T1 accordingly.

Figure 3:
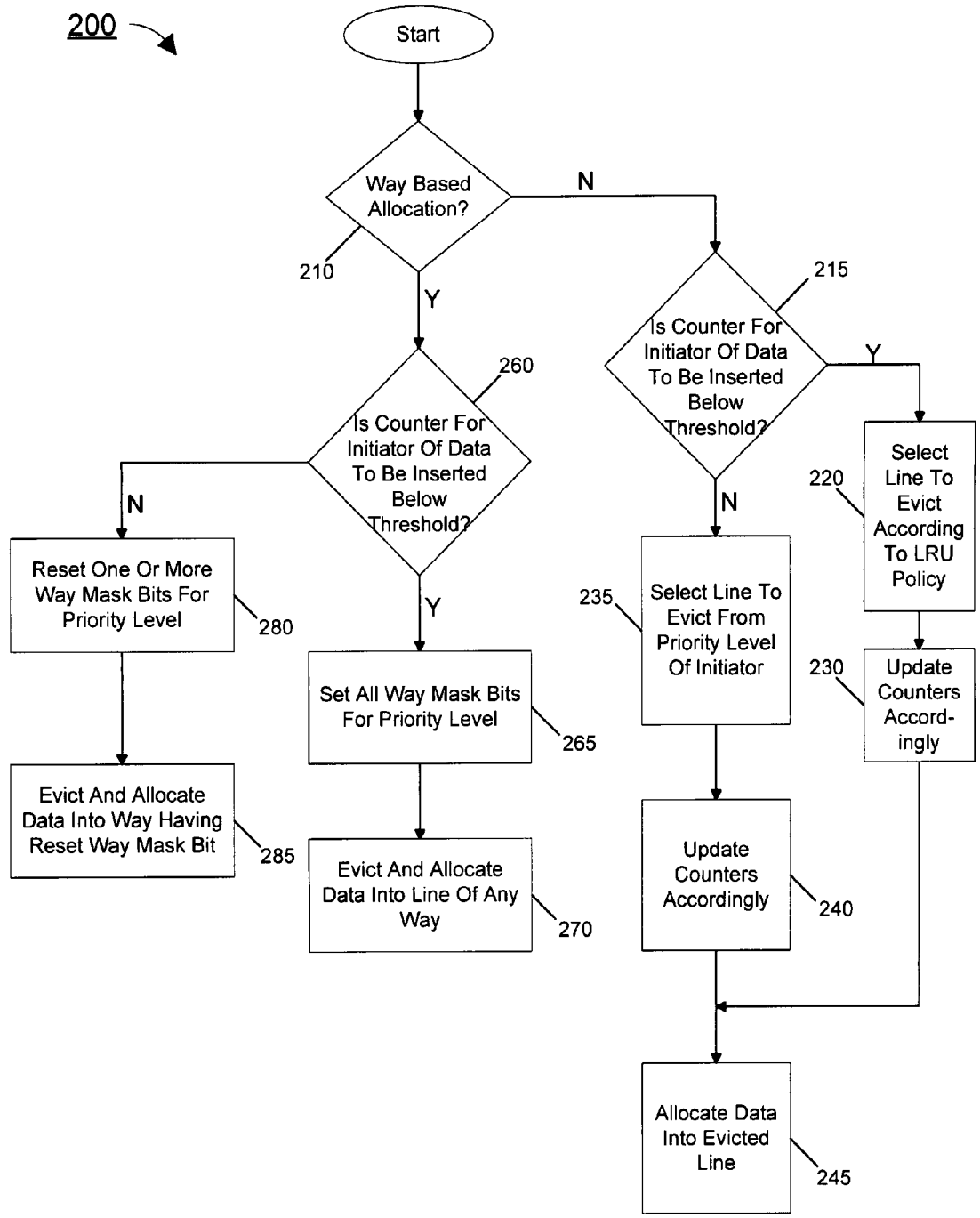
FIG. 3 is a flow diagram of a method in accordance with an embodiment of the present invention.

As described above, in various embodiments priority information present in a cache memory may be used in connection with determining an appropriate entry for replacement. Referring now to FIG. 3, shown is a flow diagram of a method in accordance with an embodiment of the present invention. As shown in FIG. 3, method 200 may be performed when data is to be allocated into a cache memory in accordance with an embodiment of the present invention. First, it may be determined whether allocation is way-based (diamond 210). If not, control passes to diamond 215 where it may be determined whether a counter associated with the initiator of the data insertion is below its threshold. If so, control passes to block 220. There, a cache line may be selected for eviction according to a desired replacement policy (block 220). For example, in many implementations a LRU policy may be implemented such that the oldest cache line may be selected for replacement. Upon replacement, the counters that were analyzed in diamond 215 may be updated accordingly (block 230). For example, if the evicted cache line was of priority level 0 and the newly allocated cache line was of priority level 1, the corresponding priority level 0 counter may be decremented and the priority level 1 counter may be incremented.

If instead at diamond 215 that the counter is above its threshold, control passes to block 235 where a line to be evicted is selected from the priority level of the initiator, which may be done on an LRU basis. Then counters may be updated accordingly (block 240). From both of blocks 230 and 240, control passes to block 245 where the desired data may be allocated into the evicted line.

Referring still to FIG. 3, if instead a way-based allocation is determined, control passes from diamond 210 to diamond 260 where it may be determined whether a counter associated with the initiator of the data insertion is below its threshold. If the counter is below the threshold, all way mask bits for the given priority level may be set (block 265). Then a given line may be evicted, e.g., on an LRU basis, and data may be allocated into the line, which may be of any way of the cache memory (block 270). If instead at diamond 260 it is determined that the counter is above its threshold, control passes to block 280, where one or more way mask bits may be reset for the given priority level. Then control passes to block 285, where a line may be evicted from a way having a reset mask bit and the desired data allocated into the evicted line.

Thus in various embodiments, mechanisms may support externally generated priorities and capacities by changing the fill policy or the replacement scheme (using either the gradient partition algorithm or the counter-based replacement policy described herein). The counter-based replacement scheme may provide support for guaranteed capacity constraints (e.g., a given thread gets a predicted amount of memory). The gradient partition algorithm-based QoS mechanism may allow a replacement scheme to control the cache allocations of various threads, not to optimize total system performance, but to reflect the priorities of a system administrator. Further, the OS or the BIOS may control the relative importance of hardware threads through externally generated priorities (e.g., via system registers), which are then used as described herein to balance cache allocation. Analogous to the counter-based replacement scheme, the gradient partition algorithm provides support to guarantee that, at steady state, the weighted (by priority) hitrate derivatives (as a function of cache allocation) among competing threads will be equal. Conceptually, this is the property that allows a high-priority thread to consume 'more than its fair share' of cache if it uses it effectively, but also allows low-priority threads to take back its share if the high-priority thread does not make efficient use of the space.

Figure 4:
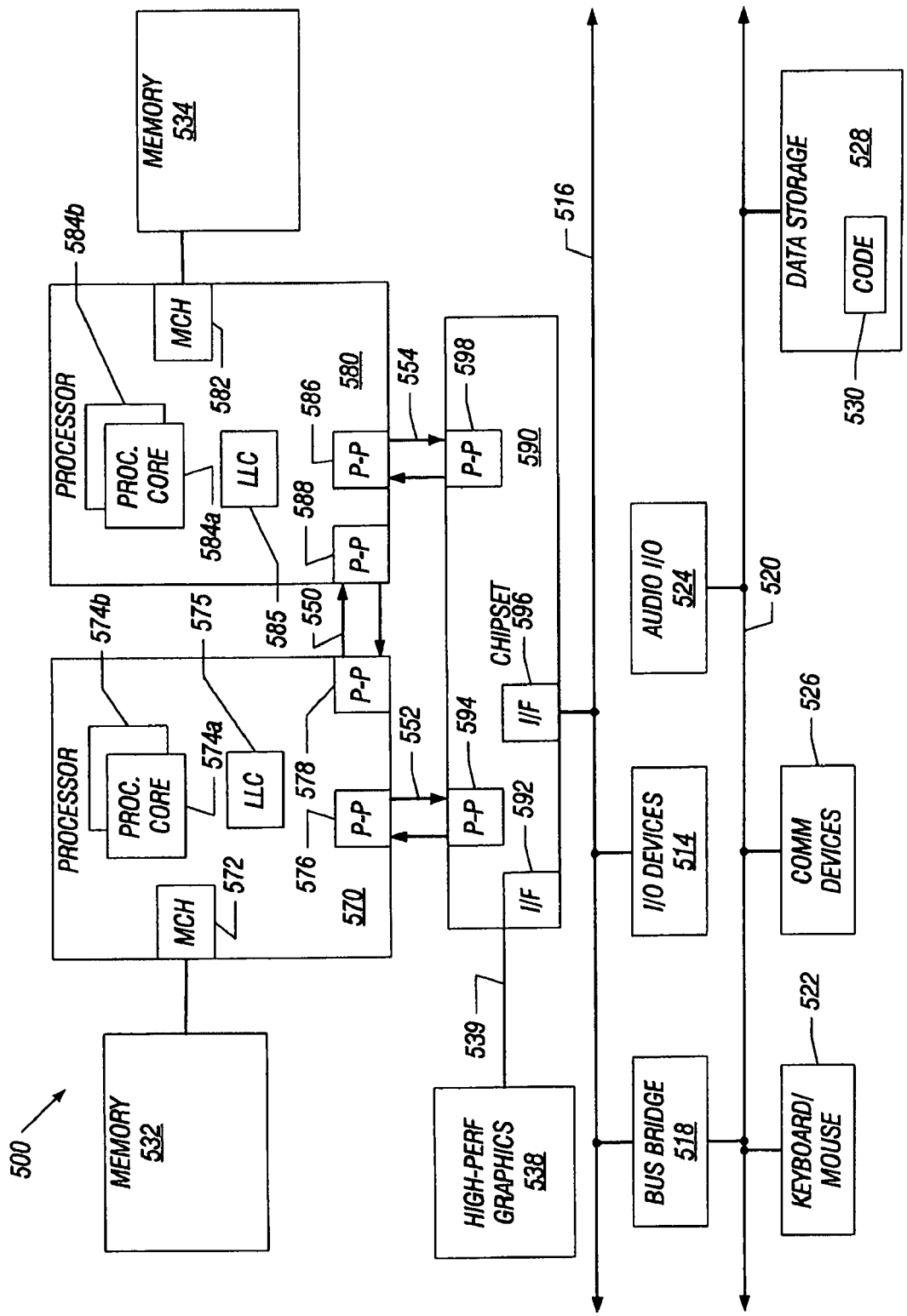
FIG. 4 is a block diagram of a multiprocessor system in accordance with an embodiment of the present invention.

Embodiments may be suited for large-scale CMP platforms, where the cache space allocation is controlled by hardware to realize fairness and reduce pollution; however, embodiments may be implemented in many different system types. Referring now to FIG. 4, shown is a block diagram of a multiprocessor system in accordance with an embodiment of the present invention. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574*a* and 574*b* and processor cores 584*a* and 584*b*), although other cores and potentially many more other cores may be present in particular embodiments, in addition to one or more dedicated graphics or other specialized processing engine. While not shown in the embodiment of FIG. 4, is to be understood that the first and second processor cores may each include one or more cache memories. Furthermore, as shown in FIG. 4 a last-level cache memory 575 and 585 may be coupled to each pair of processor cores 574a and 574b and 584a and 584b, respectively. To improve performance in such an architecture, a cache controller or other control logic within processors 570 and 580 may enable LLC's 575 and 585 to perform allocation and replacement activities using a counter-based analysis, as described above.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
associating a first priority indicator with first data stored in a first entry of a shared cache memory by a first core of a processor executing a first thread to indicate a priority level of the first thread and updating a first counter indicative of a number of entries in the shared cache memory associated with the first thread;
associating a second priority indicator with second data stored in a second entry of the shared cache memory by a graphics engine of the processor executing a second thread to indicate a priority level of the second thread and updating a second counter indicative of a number of entries in the shared cache memory associated with the second thread;
allocating the shared cache memory between the first thread and the second thread using a gradient partition algorithm in which weighted hit rate derivatives as a function of cache allocation by the first thread and the second thread are substantially equal; and
dynamically allocating additional space in the shared cache memory to the first thread, wherein the first and second threads are of an equal priority level, and the first thread is accessing the shared cache memory more than the second thread.

2. The method of claim 1, further comprising determining whether to replace a data element stored by the first thread based at least in part on a value of the first counter.

3. The method of claim 2, further comprising selecting a data element associated with the second priority indicator for replacement, wherein a value of the second counter exceeds a corresponding threshold, and the value of the first counter is below a corresponding threshold.

4. The method of claim 1, further comprising dynamically allocating additional space in the shared cache memory from the first thread to the second thread, wherein the first thread has a higher priority level than the second thread, and wherein the first tread is accessing the shared cache memory in less than a predetermined amount.

5. The method of claim 1, further comprising dynamically allocating additional space in the shared cache memory for the first thread based on comparison of a number of misses to the shared cache memory for the first tread during a time interval and a number of misses to a predictor tag of the shared cache memory for the first thread during the time interval, wherein the predictor tag is set at a different allocation than the shared cache memory with regard to space in the corresponding shared cache memory or predictor tag that may be consumed by a given priority level.

6. An apparatus comprising:
a processor having a first core and a graphics engine to independently execute instructions, wherein the first core has a first priority level associated therewith and the graphics engine has a second priority level associated therewith;
a shared cache coupled to the first core and the graphics engine, the shared cache including a plurality of lines each including a tag portion, a data portion to store data, a priority portion to indicate the priority level of the data stored in the data portion, a shadow tag storage to store a copy of the tag portion for a subset of the lines in the shared cache, the shadow tag storage to be accessed in parallel with the tag portion, and a first miss counter including counters for each priority level associated with the shadow tag storage, wherein the first miss counter is incremented if an access misses in the shadow tag storage;

a mapping table coupled to the shared cache to indicate a threshold amount of the shared cache to be occupied by each of the first and second priority levels;

a counter array coupled to the shared cache to store a count of a number of lines in the shared cache occupied by each of the first and second priority levels; and a controller coupled to the shared cache to dynamically allocate data into the shared cache for the first core and the graphics engine in accordance with the first and second priority levels.

7. The apparatus of claim 6, wherein the controller is to enforce space allocation in the shared cache according to a line-based policy or way-based policy.

8. The apparatus of claim 7, wherein the shared cache further comprises a way mask for each priority level, the way mask having a plurality of bits each corresponding to a way of the shared cache, wherein a bit in the way mask is reset if the corresponding priority level exceeds its threshold value.

9. The apparatus of claim 6, further comprising a second miss counter associated with the tag portion, wherein the second miss counter is incremented if an access misses in the tag portion.

10. The apparatus of claim 9, wherein the controller is to compare a value of the first miss counter against a value of the second miss counter, and adjust a threshold value for the first priority level and a threshold value for the second priority level based on the comparison.

11. The apparatus of claim 10, wherein the shared cache comprises a last level cache.

12. The apparatus of claim 11, wherein the apparatus comprises a multiprocessor system including a multi-core processor having the processor.

13. An apparatus comprising:

a cache memory including a plurality of lines each including a tag portion, a data portion to store data, and a priority portion to indicate a priority level of the data stored in the data portion, the priority level one of a plurality of priority levels, a shadow tag storage to store a copy of the tag portion for a subset of the lines in the cache, the shadow tag storage to be accessed in parallel with the tag portion, and a first miss counter including counters for each priority level associated with the shadow tag storage, wherein the first miss counter is incremented if an access misses in the shadow tag storage;

a mapping table coupled to the cache memory to indicate a threshold amount of the cache memory to be occupied by each of the plurality of priority levels;

a counter array coupled to the cache memory to store a count of a number of lines in the cache memory to be occupied by each of the plurality of priority levels; and a controller coupled to the cache memory to dynamically allocate data into the cache memory in accordance with the plurality of priority levels.

14. The apparatus of claim 13, wherein the cache memory further comprises a second miss counter associated with the tag portion, wherein the second miss counter is incremented if an access misses in the tag portion.

15. The apparatus of claim 14, wherein the cache memory is to compare a value of the first miss counter against a value of the second miss counter, and adjust a threshold value for at least one of the priority levels based on the comparison.

16. The apparatus of claim 13, wherein the cache memory comprises a shared cache memory coupled to a multi-core processor including at least one core and a graphics engine.

17. The apparatus of claim 16, wherein the at least one core has a first priority level associated therewith and the graphics engine has a second priority level associated therewith.

* * * * *